(12) United States Patent
Brisson et al.

(10) Patent No.: US 7,891,689 B2
(45) Date of Patent: Feb. 22, 2011

(54) WATERCRAFT TRAILER HAVING AN INTAKE PROTECTOR

(75) Inventors: Hugo Brisson, Valcourt (CA); Christian Labbe, Saint-Denis-de-Brompton (CA); Daniel Mercier, Magog (CA); Joey Larouche, Mont-Saint-Hilaire (CA); Bruno Girouard, Shefford (CA); Eric Fournier, Orford (CA)

(73) Assignee: Bombardier Recreational Products Inc., Valcourt (CA)

( * ) Notice: Subject to any disclaimer, the term of this patent is extended or adjusted under 35 U.S.C. 154(b) by 265 days.

(21) Appl. No.: 12/263,037

(22) Filed: Oct. 31, 2008

(65) Prior Publication Data

US 2010/0109284 A1 May 6, 2010

(51) Int. Cl.
*B60P 3/10* (2006.01)
(52) U.S. Cl. .................. 280/414.1; 280/414.3; 114/344
(58) Field of Classification Search ............... 280/414.1, 280/414.3; 114/344; 440/46; 224/401, 406
See application file for complete search history.

(56) References Cited

U.S. PATENT DOCUMENTS

| | | | | |
|---|---|---|---|---|
| 3,365,733 A | * | 1/1968 | Gudmundson | 114/344 |
| 3,369,776 A | * | 2/1968 | Puryear | 244/53 B |
| 6,719,317 B1 | * | 4/2004 | Grovender et al. | 280/414.1 |
| 6,722,683 B1 | * | 4/2004 | Heuiser | 280/414.1 |
| 2003/0123966 A1 | * | 7/2003 | Schwitters | 414/537 |
| 2006/0283902 A1 | * | 12/2006 | Vitito | 224/400 |
| 2007/0125285 A1 | * | 6/2007 | Conrad | 114/55.5 |
| 2009/0020981 A1 | * | 1/2009 | Pellingrino | 280/414.1 |
| 2009/0170383 A1 | * | 7/2009 | Carlson | 440/46 |

* cited by examiner

*Primary Examiner*—Lesley Morris
*Assistant Examiner*—Tashiana Adams
(74) *Attorney, Agent, or Firm*—Osler, Hoskin & Harcourt LLP

(57) ABSTRACT

A watercraft trailer has a watercraft receiving portion and a lower frame adapted to support a watercraft in the watercraft receiving portion. The lower frame has at least one a longitudinally extending member, a front portion, and a rear portion, a rearmost part of the rear portion being a rear end. The trailer also has a hitch coupler connected to the front portion of the lower frame, a first wheel, having a rotation axis, and a second wheel operatively connected to the lower frame. The trailer has a longitudinally extending intake protector connected to the rear portion of the lower frame. At least a portion of the intake protector is disposed between the rotation axis and the rear end of the lower frame, such that when the watercraft is received in the watercraft receiving portion, the intake protector is disposed below at least a portion of the watercraft.

20 Claims, 15 Drawing Sheets

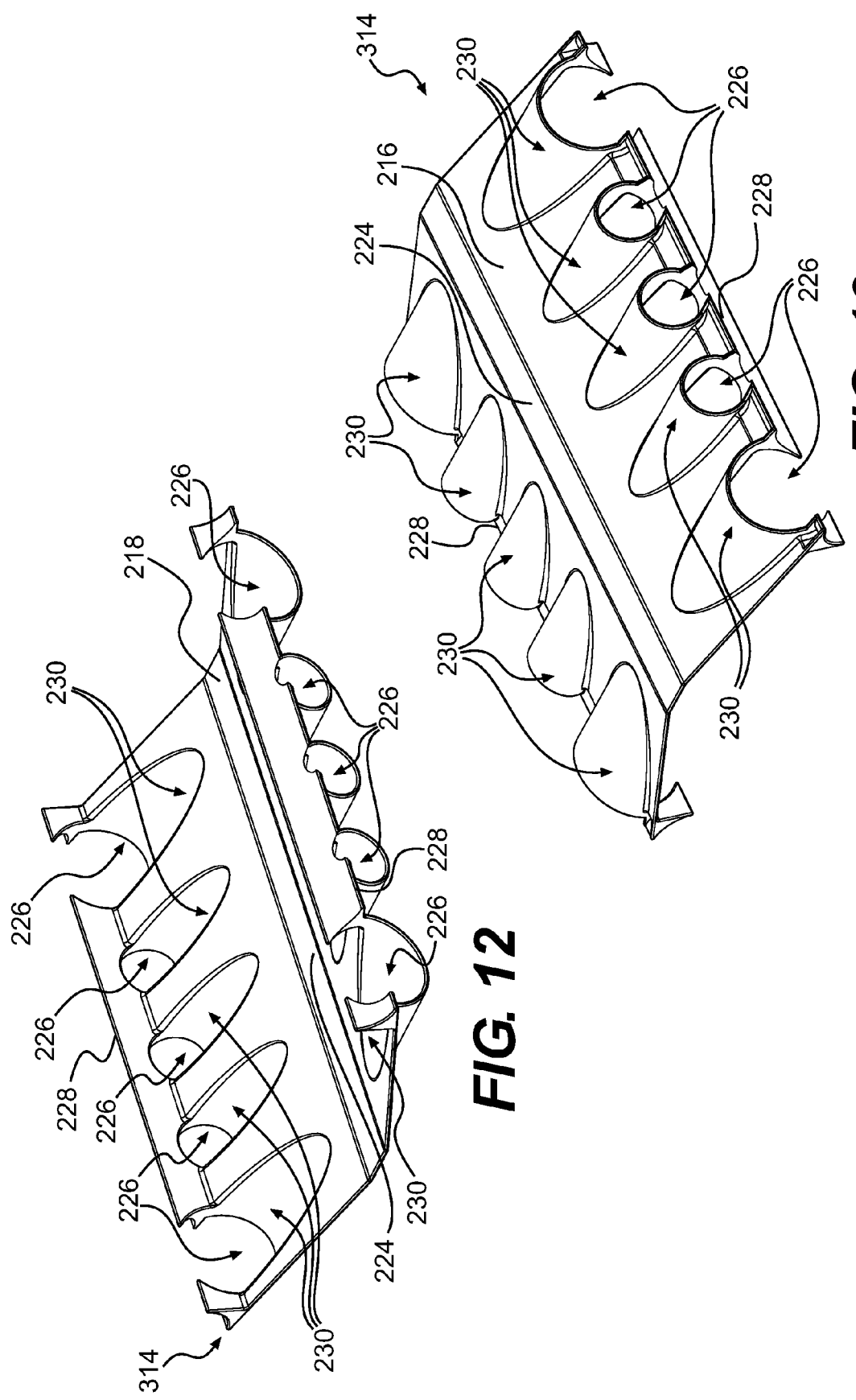

WATERCRAFT TRAILER HAVING AN INTAKE PROTECTOR

CROSS-REFERENCE

The present application is related to International Application Number PCT/US08/062,024 filed on Apr. 30, 2008, the entirety of which is incorporated herein by reference.

FIELD OF THE INVENTION

The present invention relates to trailers used to transport watercraft having a jet propulsion system.

BACKGROUND OF THE INVENTION

In order to transport a watercraft having a jet propulsion system from one body of water to another, or between a body of water and a storage location, trailers that can be hitched to a motorized wheeled vehicle are often used. To receive the watercraft onto a trailer from water, typically, the trailer is backed down a ramp (either man-made or natural) at least partially into the water. The watercraft is then guided onto the trailer such that the watercraft sits on support structures of the trailer. Then the watercraft is secured to the trailer. Finally, the trailer and watercraft are pulled out of the water using the motorized vehicle.

In most such trailers, the watercraft is driven with the jet propulsion system while the watercraft is in deep waters towards the trailer standing on the shore at least partly in water, but sufficiently for part of the watercraft to float above the support structures. Then, while the watercraft is approaching the shallow waters near the shore, the jet propulsion system is set to idle speed or is fully switched off, such that the watercraft is propelled forward towards the shore by its own inertia. Once the watercraft reaches the proximity of the trailer, the driver aligns the watercraft onto the trailer by using the support structures which are adapted to engage a hull of the watercraft. These structures can consist of one or more beams or rollers. When the watercraft is engaged on the structure, and there is no rocks or other debris in the proximity of a stem of the watercraft on the bottom of the body of water, the driver usually applies throttle to move the watercraft further to the front of the trailer. Sometimes, when the watercraft is afloat above the support structures of the trailer, but there are rocks or other debris on the bottom of the body of water in the proximity of the stern of the watercraft, the driver may choose not to apply the throttle to advance watercraft further to the front of the trailer, rather the driver may choose to advance the watercraft manually to avoid having rocks or debris enter the jet propulsion system.

To set afloat the watercraft from a trailer, the trailer with the watercraft thereon is backed down a ramp (either man-made or natural) at least partly into the water, but sufficiently for the watercraft to float above the support structures. If there are no rocks or debris in the proximity of the stern of the watercraft, then the driver starts the jet propulsion system of the watercraft and applies some throttle in reverse to move the watercraft away from the trailer. If there are rocks or debris, then the watercraft is manually pushed away off the trailer. Finally, the trailer is pulled out of the water using the motorized vehicle.

The jet propulsion system usually has an intake located in a bottom of the hull, an intake grate covering the intake, an impeller, and a steering nozzle at the rear end of the hull. The impeller propels the water through the intake towards the nozzle and the nozzle discharges a high speed water stream in a direction selected by a driver, thus driving the watercraft. The intake grate is designed to prevent large rocks and other large debris from being sucked into the intake, along with propelled water, and damaging the impeller. The intake grate is optimized for stopping large rocks and large debris from entering the intake while allowing a sufficient volume of water to enter the intake to drive the watercraft.

An inconvenience arising during the receiving or the setting afloat of the watercraft onto or from the trailer, is that if the water level at a trailer rear portion is low, the jet propulsion system will suck into the intake, along with the propelled water, small and medium sized rocks, sand and other debris located on a bottom of a body of water below the intake. These small and medium sized rocks, sand and other debris will pass unhampered through the intake grate and damage the impeller of the jet propulsion system. Damaging the impeller may stop the jet propulsion system from functioning properly or functioning altogether. Repairing or replacing the impeller is costly and inconvenient. To avoid this problem, the watercraft is typically pushed off the trailer manually to launch the watercraft into the water. Often a strong push is required to push the watercraft off the trailer and far enough into deep water. Typically, to receive the watercraft onto the trailer, the watercraft is manually pushed onto the support structures of the trailer before securing the watercraft onto the trailer. Due to this, often, more than one person is required to launch or to receive the watercraft from or onto the trailer.

Therefore, there is a need for hampering and preventing small and medium sized rocks, sand and other debris from entering the intake of the jet propulsion system during the securing or the setting afloat of the watercraft onto and from a trailer in shallow waters or when the water level near the rear portion of the trailer is low.

SUMMARY OF THE INVENTION

It is an object of the present invention to ameliorate at least some of the inconveniences present in the prior art.

It is also an object of the present invention to provide a trailer with an intake protector, such that when the trailer with a watercraft thereon is backed down a ramp (either natural or man-made) in order to set the watercraft afloat in shallow waters, the intake protector discourages rocks, sand and other debris located on a bottom of a body of water below an intake of a jet propulsion system of the watercraft from entering the intake, thus, preventing the damage to an impeller of the jet propulsion system.

In one aspect, the invention provides a watercraft trailer having at least one watercraft receiving portion with a longitudinal centerline and a lower frame. The lower frame is adapted to support a watercraft in the at least one watercraft receiving portion. The lower frame has at least one a longitudinally extending member, a front portion, and a rear portion located rearwardly of the front portion. A rearmost part of the rear portion is a rear end. The trailer also has a hitch coupler connected to the front portion of the lower frame, a first wheel and a second wheel operatively connected to the lower frame. The first wheel has a rotation axis. The trailer further has at least one longitudinally extending intake protector connected to the rear portion of the lower frame, wherein a vertical plane containing the longitudinal centerline passes through the at least one intake protector. At least a portion of the at least one intake protector is disposed between the rotation axis and the rear end of the lower frame, such that when the watercraft is received in the at least one watercraft receiving portion the at least one intake protector is disposed below at least a portion of the watercraft In a further aspect, the least one intake protector has at least one water flow aperture.

In an additional aspect, when the watercraft is received in the at least one watercraft receiving portion the at least one intake protector is spaced from the portion of the watercraft.

In another aspect, the lower frame has a watercraft support member. In yet a further aspect, the at least one intake protector is connected to the watercraft support member.

In an additional aspect, the watercraft support member is connected to the at least one longitudinally extending member.

In yet another aspect, the at least one intake protector is connected to the at least one longitudinally extending member.

In a further aspect, the at least one watercraft receiving portion is two watercraft receiving portions disposed side by side. And the at least one intake protector is two intake protectors. One of the two intake protectors being disposed in each of the two watercraft receiving portions between the rotation axis and the rear end of the lower frame, such that, when two watercraft are received in the two watercraft receiving portions, the two intake protectors are disposed below at least a portion of each of the watercraft.

In another aspect, the at least one intake protector has a generally V-shaped cross-section.

In a second aspect, the invention provides a trailer adapted for towing a watercraft. The watercraft has a hull and a jet propulsion system. The jet propulsion system has an intake located in a bottom of the hull. The trailer has at least one watercraft receiving portion and a lower frame adapted to support a watercraft in the at least one watercraft receiving portion. The lower frame has at least one longitudinally extending lower frame member, a front portion, and a rear portion located rearwardly of the front portion. The trailer also has a hitch coupler connected to a front of the lower frame, a first wheel and a second wheel operatively connected to the lower frame. The first wheel has a rotation axis. The trailer further has at least one intake protector connected to the lower frame, such that, when the watercraft is received in the at least one watercraft receiving portion, the at least one intake protector is aligned with the intake of the jet propulsion system. In an additional aspect, the at least one intake protector has at least one water flow aperture.

In a further aspect, when the watercraft is received in the at least one watercraft receiving portion, the at least one intake protector is spaced from the intake of the jet propulsion system.

In another aspect, the at least one intake protector is connected to the rear portion of the lower frame.

In an additional aspect, the lower frame has a watercraft support member.

In yet a further aspect, the at least one intake protector is connected to the watercraft support member.

In yet another aspect, the watercraft support member is connected to the at least one longitudinally extending member.

In an additional aspect, the lower frame has a laterally extending member connected to the at least one longitudinally extending member. The laterally extending member has a first end and a second end opposite the first end. The first wheel is connected to a first end and the second wheel is connected to the second end. The at least one intake protector is connected to the laterally extending member.

In a further aspect, the at least one intake protector is connected to the at least one longitudinally extending member.

In another aspect, the at least one watercraft receiving portion is two watercraft receiving portions disposed side by side. The at least one intake protector is two intake protectors. One of the two intake protectors is disposed in each one of the two watercraft receiving portions, such that when two watercraft are received in the two watercraft receiving portions, each intake protector is aligned with an intake of the jet propulsion systems of a corresponding watercraft.

In yet a further aspect, the at least one intake protector has a generally V-shaped cross-section.

For purposes of this application, the end of the trailer having the hitch coupler should be understood as corresponding to the front end of the trailer and the terms related to spatial orientation such as forwardly, rearwardly, front, rear, left, right, below, longitudinal, lateral, vertically, and vertically longitudinal, are as they would accordingly be understood.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein. Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIG. 12 is a top perspective view, taken from front, left side, of the intake protector of the trailer of FIG. 7;

FIG. 13 is a bottom perspective view, taken from front, left side of the intake protector of FIG. 12;

DETAILED DESCRIPTION OF THE PREFERRED EMBODIMENTS

Figure 4:
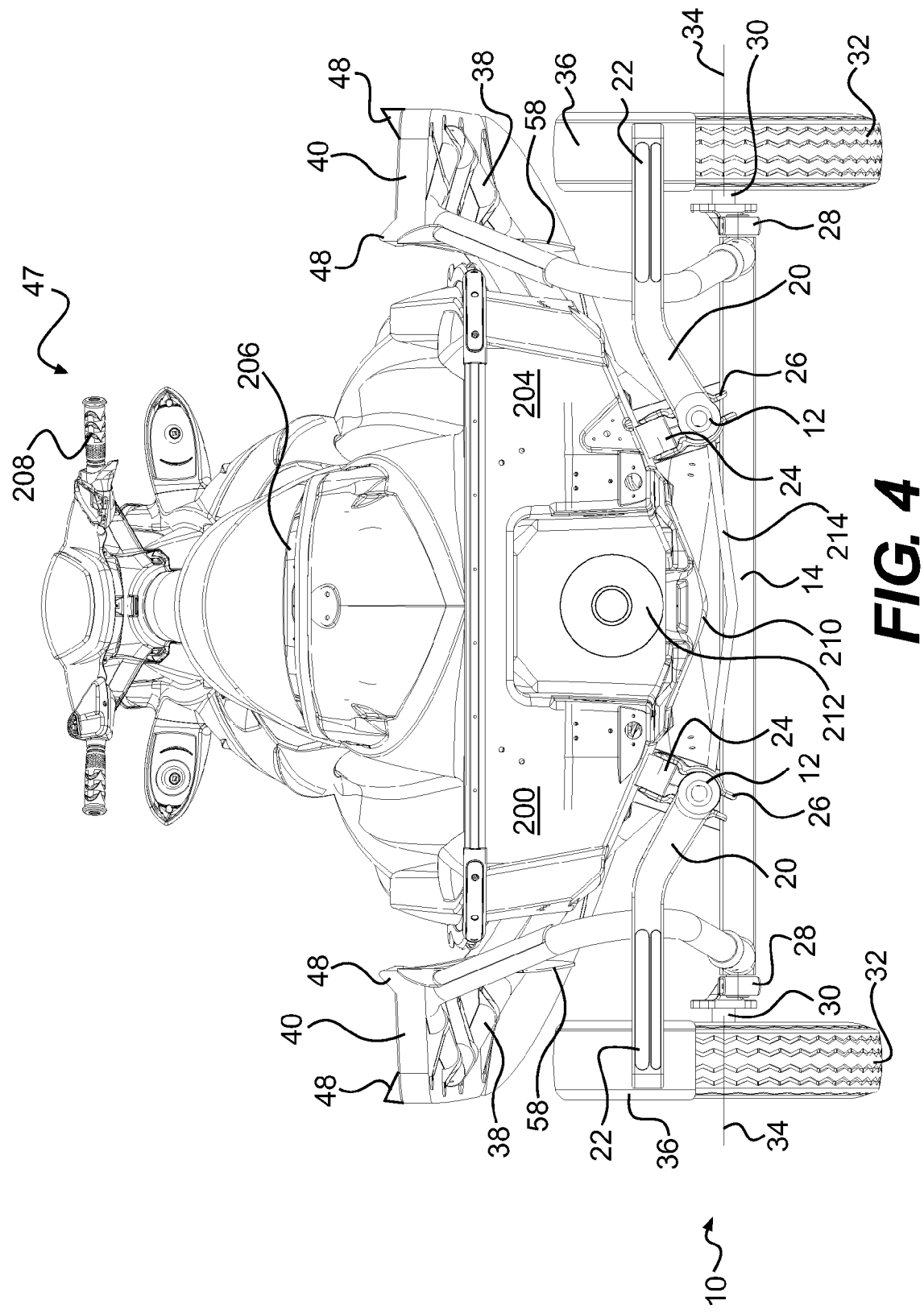
FIG. 4 is a rear elevation view of the trailer of FIG. 1 with a personal watercraft supported thereon.
Figure 5:
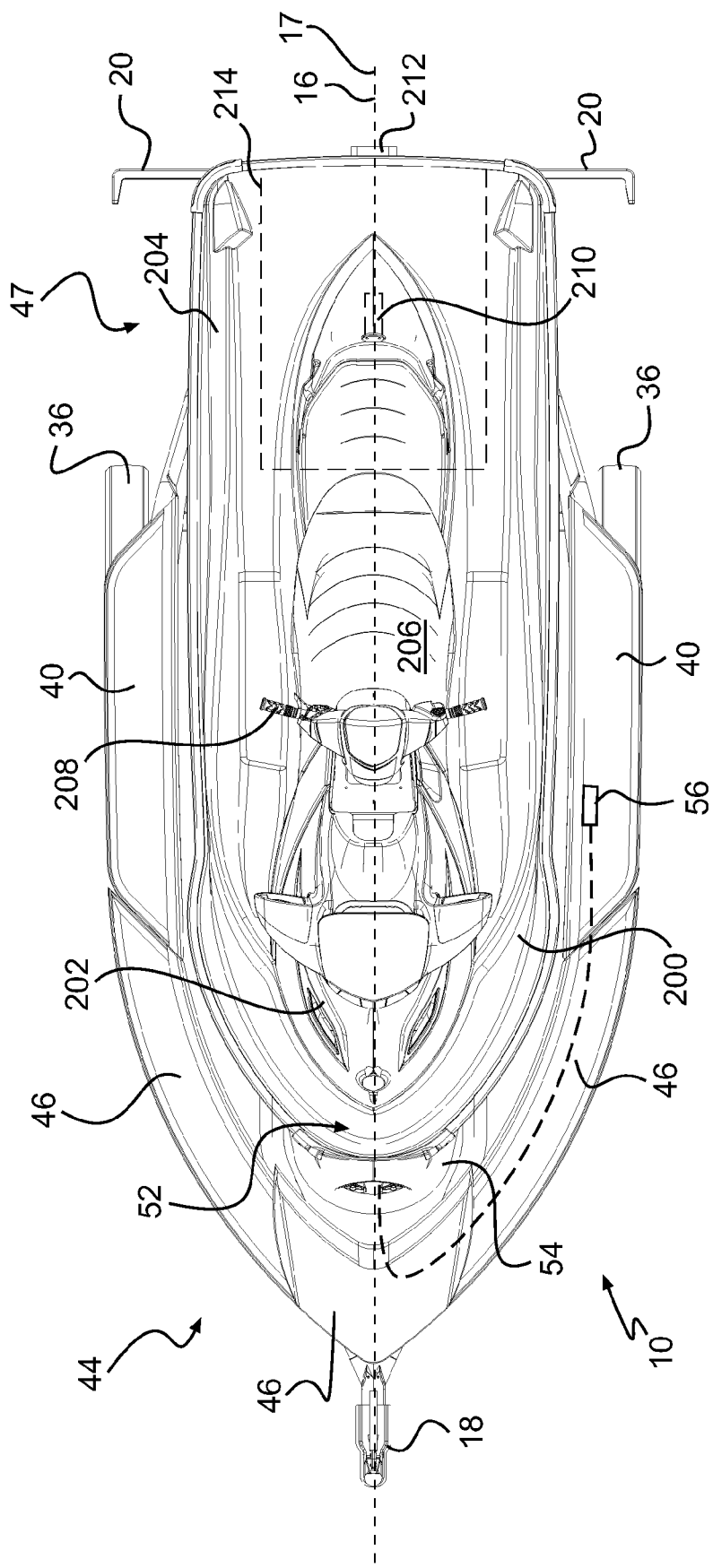
FIG. 5 is a top plan view of the trailer and watercraft of FIG. 4.
Figure 6:
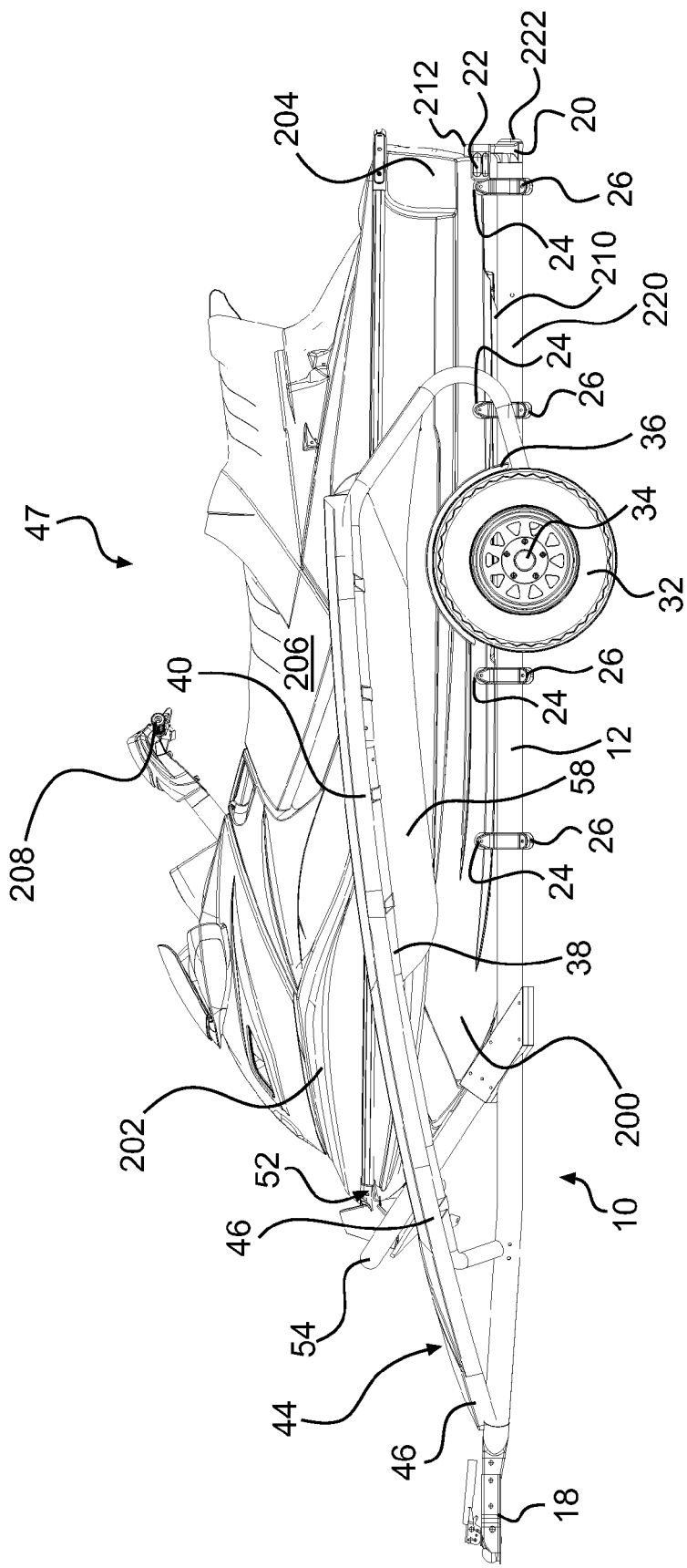
FIG. 6 is a left side elevation view of the trailer and the watercraft of FIG. 4.

The present invention will be described with respect to trailers adapted to transport personal watercraft having a jet propulsion system. However it should be understood that the dimensions of the embodiments of the trailers described herein could be increased to accommodate larger watercraft having jet propulsion systems, such as jet boats. As shown in FIGS. 4 to 6, a watercraft 47 to be transported by a trailer according to the present invention has a hull 200, a bow 202, a stern 204, a seat 206 between the bow 202 and the stern 204, handlebars 208, and a jet propulsion system. The jet propulsion system is driven by an engine (not shown) via a drive shaft (not shown) connected to the engine. The jet propulsion system has an intake 210 located in the bottom of the hull 200, an impeller (not shown) connected to the drive shaft, and a steering nozzle 212 (FIG. 4) at the stern 204. The watercraft 47 will not be described in more detail herein as the construction of such watercraft is believed to be well known. An exemplary personal watercraft is described in detail in U.S. Pat. No. 7,128,014 B2, issued Oct. 31, 2006, the entirety of which is incorporated herein by reference. An exemplary jet boat is described in detail in U.S. Pat. No. 7,421,969, issued on Sep. 9, 2008, the entirety of which is incorporated herein by reference. The exemplary jet boat also has a jet propulsion system having an engine, a drive shaft, an impeller, an intake and a nozzle. Similarly to the personal watercraft, the intake of the jet propulsion system of the jet boat is located at a bottom rear part of the jet boat.

FIGS. 1 to 6 illustrate a first embodiment of a watercraft trailer 10. The trailer 10 has a lower frame having left and right longitudinally extending lower frame members 12 and a laterally extending lower frame member 14. The frame members 12 and 14 are preferably metal tubes, but other materials and shapes (beams for example) are contemplated.

The left and right longitudinally extending lower frame members 12 are disposed on either sides of a longitudinal centerline 16 (FIGS. 2 and 3) of the trailer 10. Front portions of the left and right longitudinally extending lower frame members 12 bend inwardly towards the longitudinal centerline 16 and are connected at the longitudinal centerline 16 by welding, bolts or other mechanical fasteners.

A hitch coupler 18 is welded, fastened, or otherwise connected to the front of the left and right longitudinally extending lower frame members 12. The hitch coupler 18 allows the trailer 10 to be coupled to a matching tow hitch on a vehicle, thus allowing the trailer 10 to be towed by the vehicle. The features of the hitch coupler 18 will vary depending on the type of tow hitch to which one desires to couple the trailer 10. In one embodiment, the hitch coupler 18 is adapted to be coupled to a tow-ball commonly used on road vehicles such as cars and trucks.

A bracket 20 is connected to a rear end of each of the longitudinally extending lower frame member 12 and extends laterally outwardly therefrom. Each bracket 20 has reflectors and/or lights 22 disposed thereon. The reflectors and/or lights 22 are required by many jurisdictions for the trailer 10 to be suitable for road use.

Figure 1:
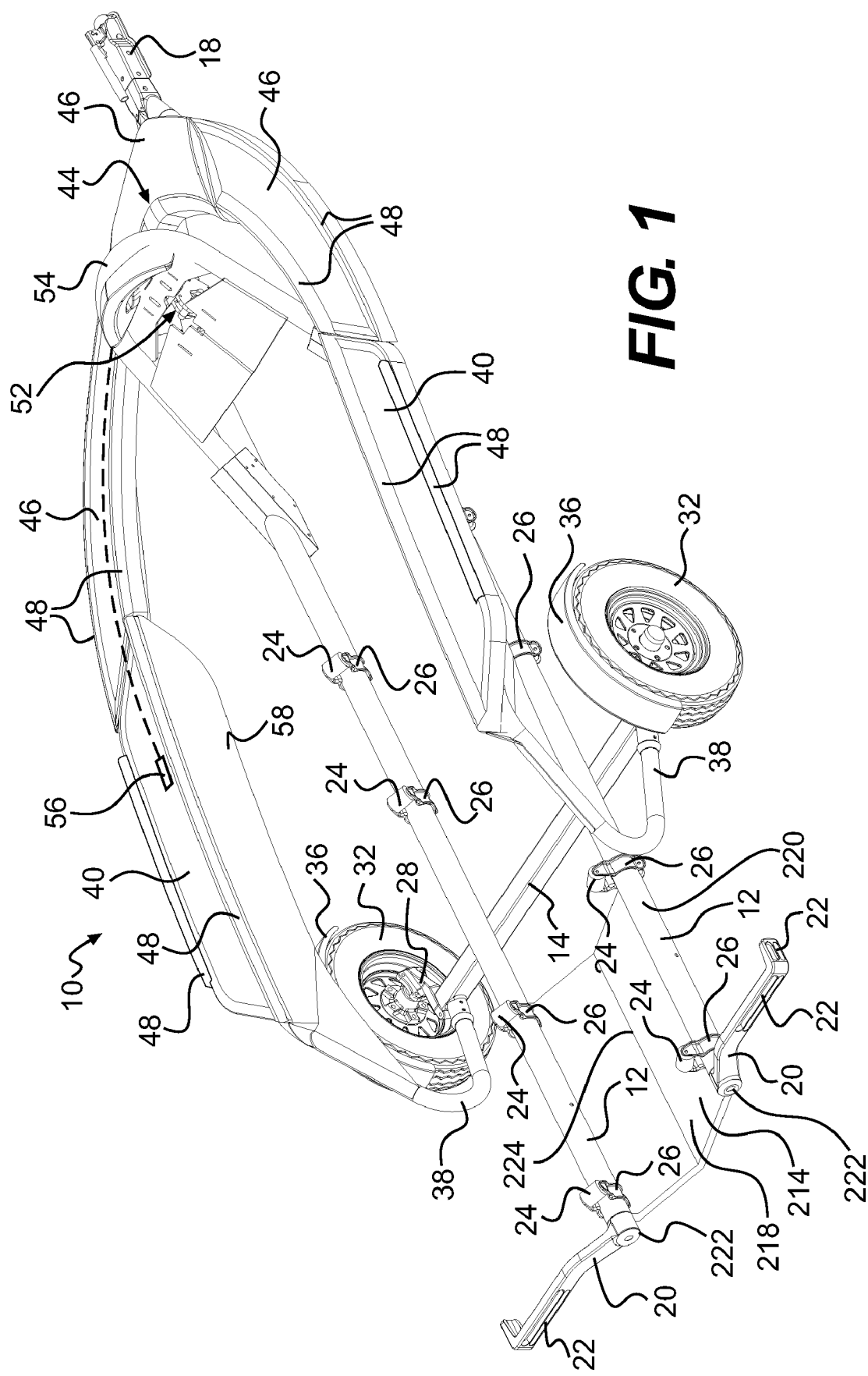
FIG. 1 is a top perspective view, taken from a rear, right side, of a first embodiment of a watercraft trailer with an intake protector attached thereto.
Figure 7:
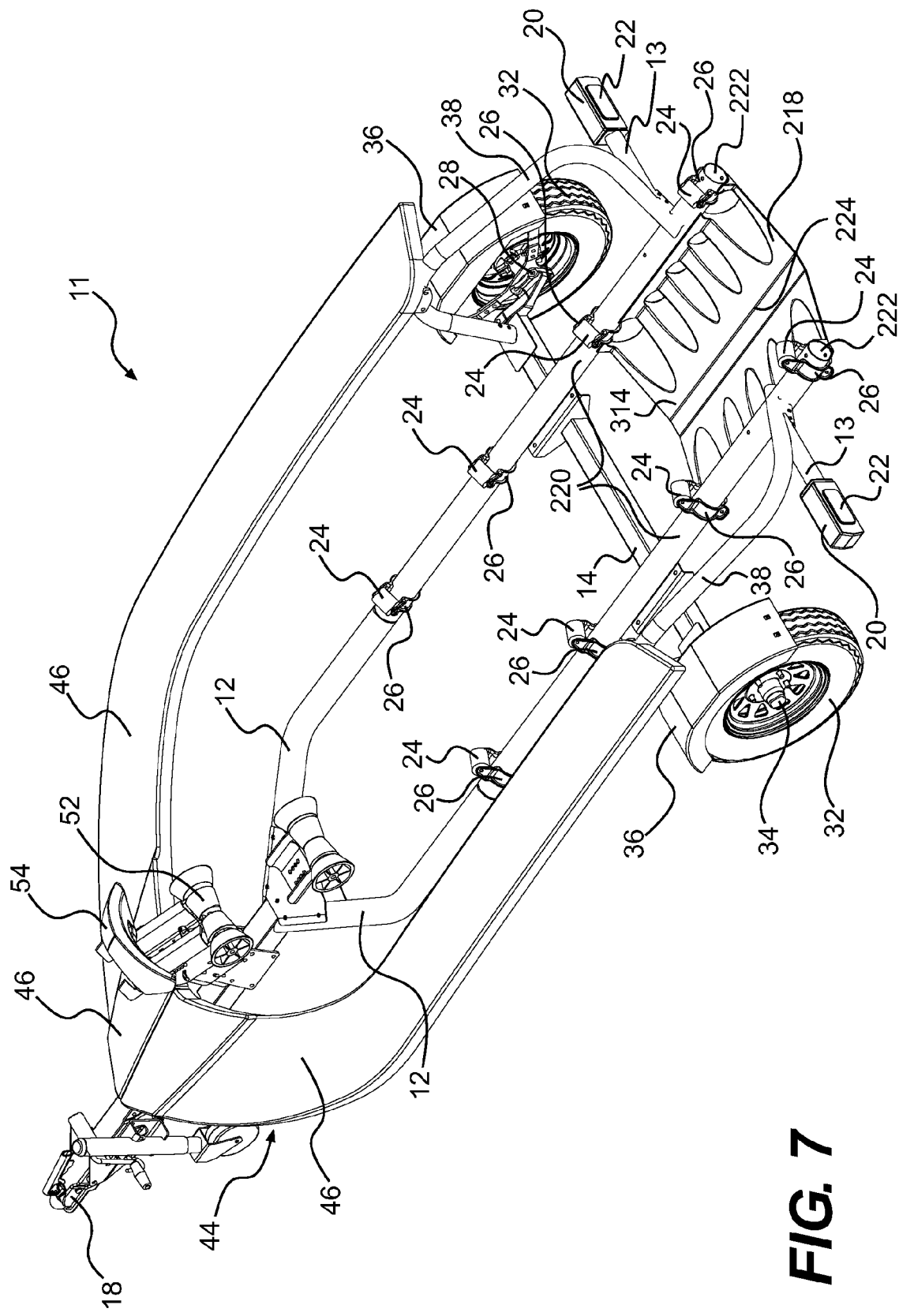
FIG. 7 is a top perspective view, taken from a rear, left side, of a second embodiment of a watercraft trailer with an intake protector attached thereto.

Watercraft supporting members in the form of a plurality of low friction rollers 24 are connected to each of the longitudinally extending lower frame member 12 by brackets 26. The rollers 24 allow a watercraft for which the trailer 10 is adapted to easily slide in and out of the trailer 10. As best seen in FIGS. 1 and 7, the rollers 24 are angled laterally inwardly. Angling the rollers 24 as shown, makes the trailer 10 better adapted to receive watercraft having a V-shaped hull. The angle and position of the rollers 24 on the longitudinally extending lower frame members 12 can be adjusted to accommodate different watercraft. It is contemplated that the watercraft supporting members could alternatively be in the form of sliding boards or other structure to allow a watercraft to slide in and out of the trailer 10 with only moderate friction. It is also contemplated that the rollers 24 and brackets 26 could be omitted, in which case a watercraft would slide directly on the longitudinally extending frame members 12 and as such the longitudinally extending frame members 12 would act as the watercraft supporting members.

The laterally extending lower frame member 14 is disposed under the longitudinally extending lower frame members 12 and extends perpendicularly thereto. The laterally extending lower frame member 14 is connected the longitudinally extending lower frame members 12 by welding, bolts or other mechanical fasteners.

A wheel mount 28 is connected to each end of the laterally extending lower frame member 14 and extends forwardly therefrom. A wheel axle 30 (FIG. 4) extends laterally outwardly from the forward end of each wheel mount 28. A wheel 32 is mounted to each wheel axle 30 for rotation about a wheel rotation axis 34 (FIGS. 4 and 6). A fairing 36 is mounted over each wheel 32. The connections between the wheel mounts 28 and the laterally extending frame member 14 include elastomeric members (not shown) which allow for some torsion of the wheel mounts 28 relative to the laterally extending frame member 14, thus acting as a suspension for the trailer 10. It is contemplated that other types of suspensions could be used or that no suspension could be used. It is also contemplated that the wheels 32 could be mounted to the laterally extending frame member 14 such that the wheel rotation axis 34 could be in alignment with the laterally extending frame member 14 or disposed rearwardly of the laterally extending frame member 14.

The trailer 10 also has an upper frame having left and right upper frame members 38. The frame members 38 are preferably metal tubes, but other materials and shapes (beams for example) are contemplated. The rear ends of the upper frame members 38 are connected to the laterally extending lower frame member 14 at positions laterally outwardly of the longitudinally extending lower frame members 12. It is contemplated that the rear ends of the upper frame members 38 could be connected elsewhere on the lower frame, such as on the longitudinally extending lower frame members 12. The forward ends of the upper frame members 38 are connected to the front portions of their corresponding longitudinally extending lower frame members 12. It is contemplated that the upper frame may be omitted, or that the upper frame may have only one of the left and right members 38.

Figure 3:
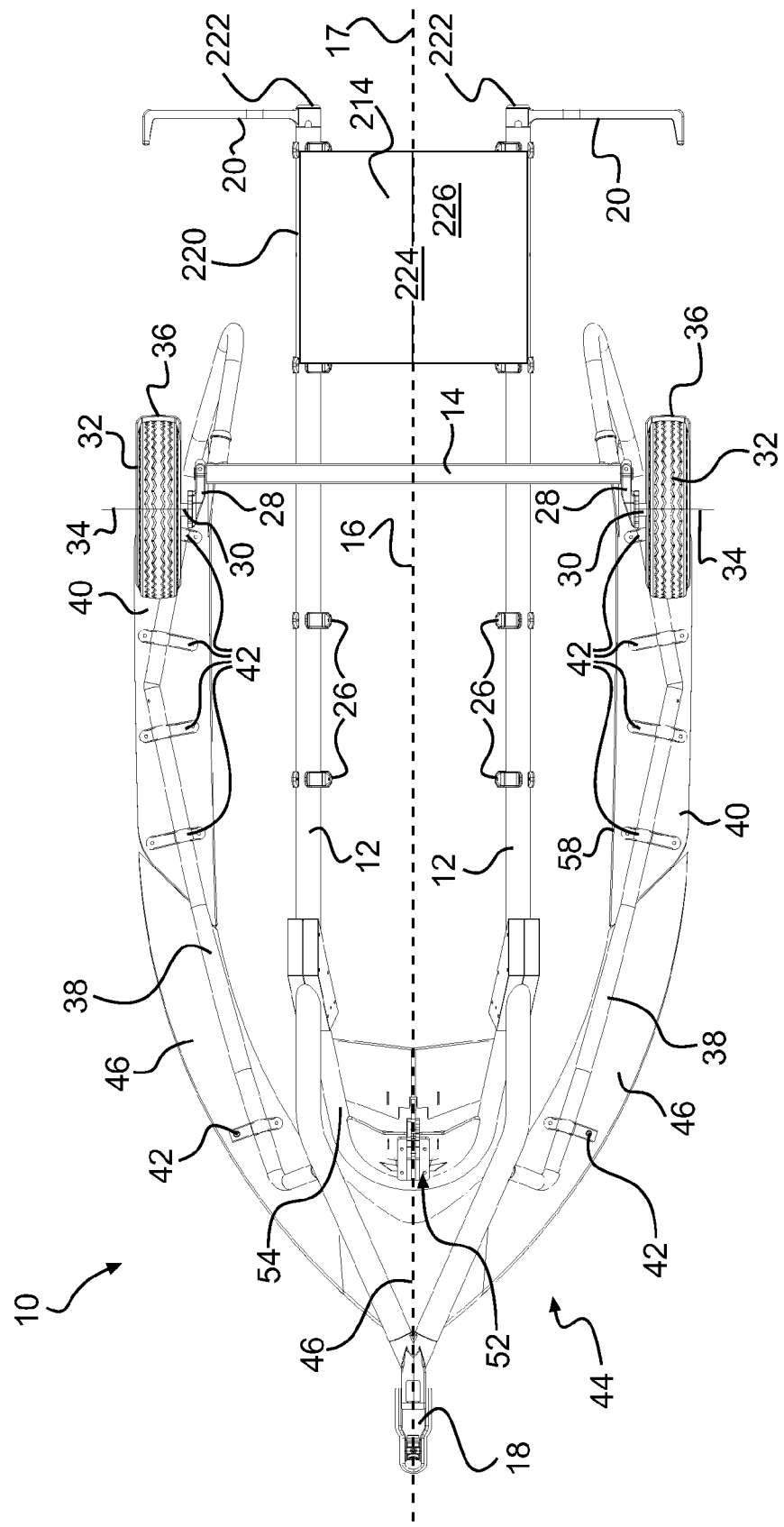
FIG. 3 is a bottom plan view of the trailer of FIG. 1.
Figure 8:
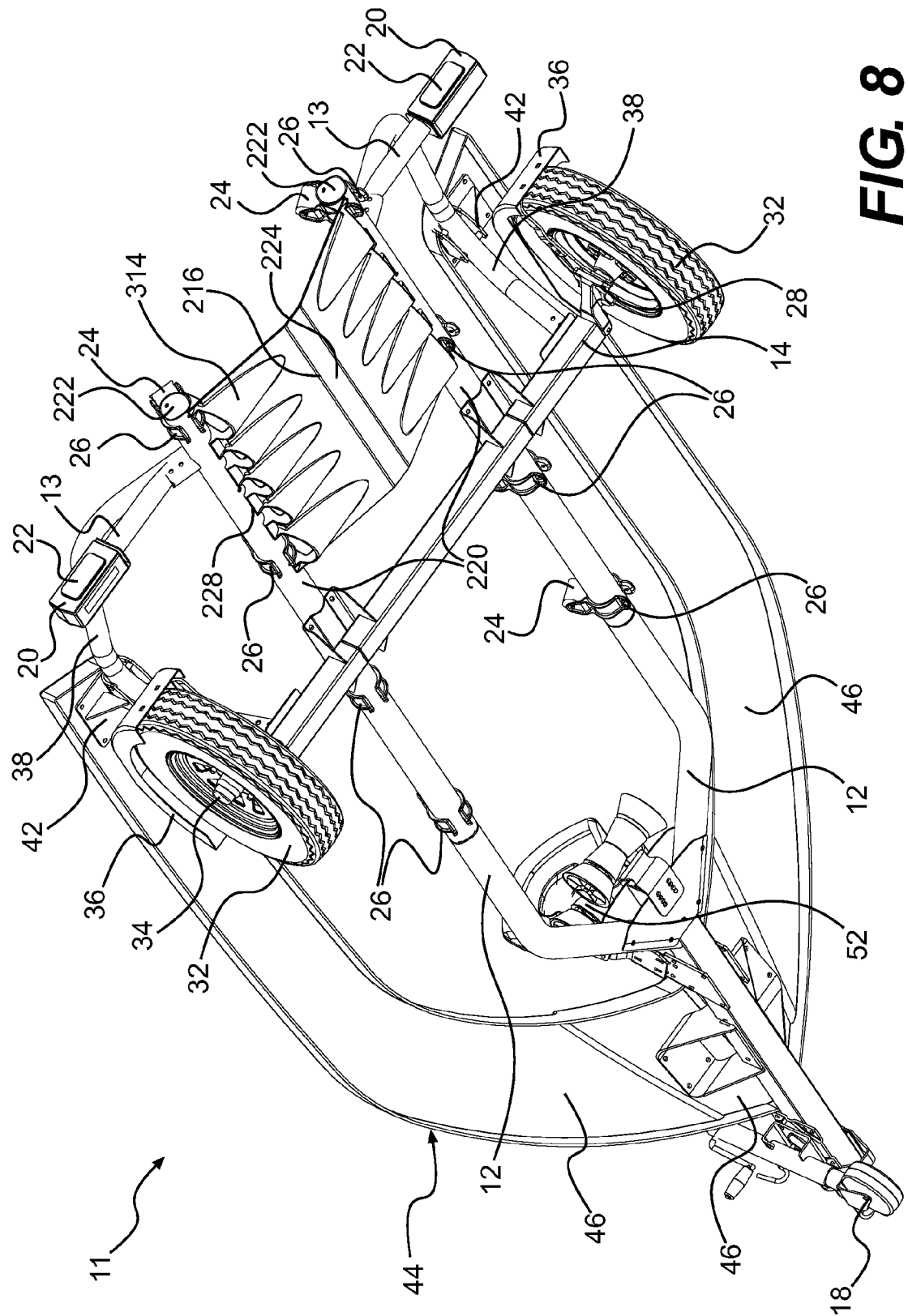
FIG. 8 is a bottom perspective view taken from a rear, left side of the trailer of FIG. 7.
Figure 9:
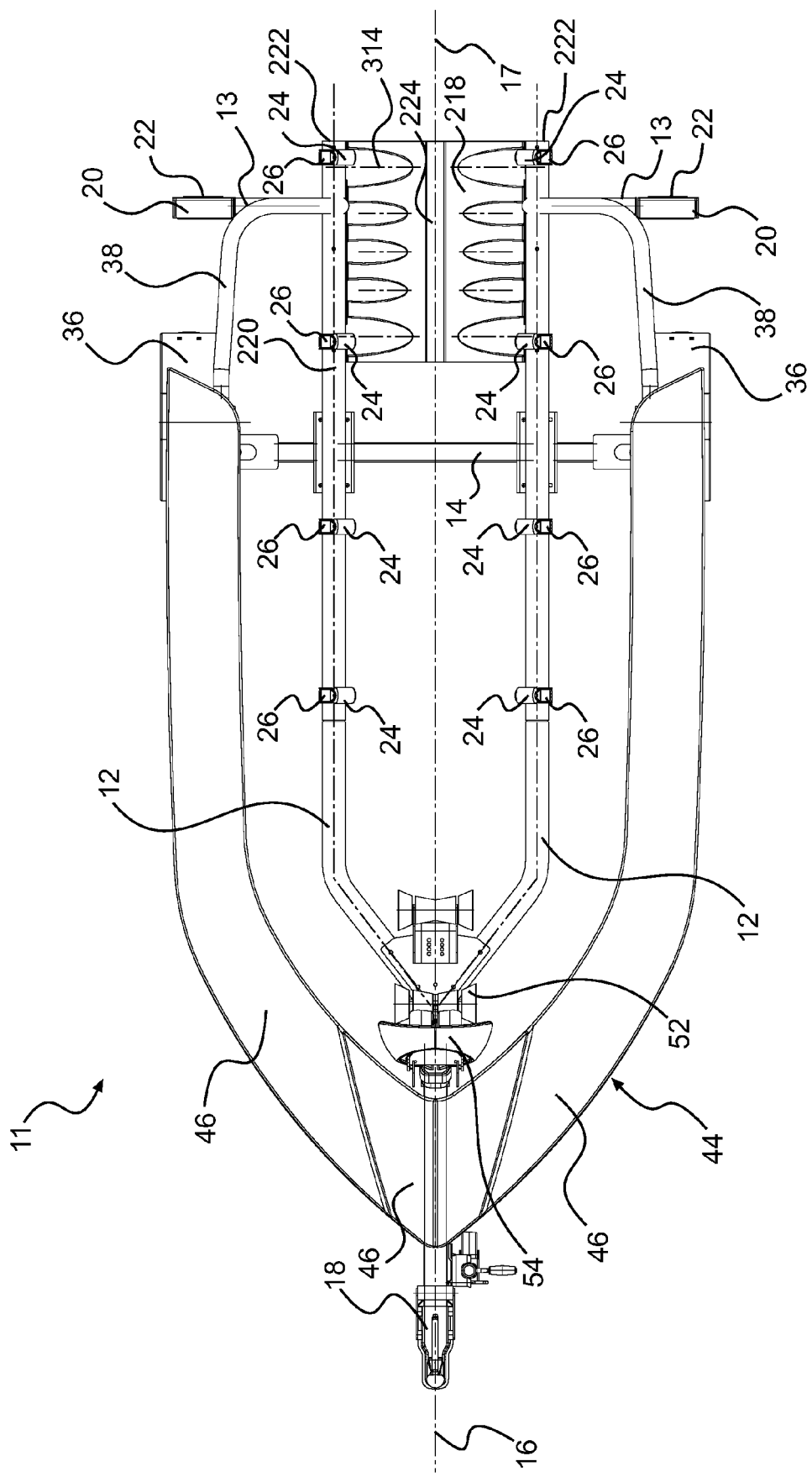
FIG. 9 is a top plan view of the trailer of FIG. 7.

The left upper frame member 38 supports a left walk board 40 which is held in place on the left upper frame member 38 by brackets 42 (FIG. 3). As can be seen, the left walk board 40 is disposed to the left of the left longitudinally extending lower frame member 12. Similarly, the right upper frame member 38 supports a right walk board 40 which is held in place on the right upper frame member 38 by brackets 42. As can also be seen, the right walk board 40 is disposed to the right of the right longitudinally extending lower frame member 12. The left and right walk boards 40 are mirror images of each other, however it is contemplated that they could not be. A generally U-shaped walk board 44 is disposed forwardly of the left and right walk boards 40. The rear of the generally U-shaped walk board 44 is supported by the left and right upper frame members 38 and the front of the generally U-shaped walk board 44 rests on the forward portions of the left and right longitudinally extending lower frame members 12 (see FIG. 3). The generally U-shaped walk board 44 is held onto the left and right upper frame members 38 by brackets 42. The rear ends of the U-shaped walk board 44 are disposed adjacent to the forward ends of the left and right walk boards 40 so as to form a continuous walk board. The generally U-shaped walk board 44 is made of three sections 46, but it is contemplated that it could be made of a single part, two sections, or more than three sections. Similarly, the left and right walk boards 40 could be made of multiple sections. It is also contemplated that the two walk boards 40 and the generally U-shaped walk board 44 could be integrally formed as a single part (FIGS. 7, 8 and 9).

The inner edges of the walk boards 40 and of the generally U-shaped walk board 44 define therebetween a watercraft receiving portion. As seen in FIGS. 4 and 5, a watercraft 47 received in the watercraft receiving portion occupies the majority of the watercraft receiving portion. The distance D (FIG. 2) between the inner edges of the left and right walk boards 40 is greater than or equal to a width of a watercraft for which the trailer 10 is adapted. For a trailer 10 for a personal watercraft, such as the personal watercraft 47 shown in FIGS. 4 to 6, the distance D is preferably at least 100 cm. It is contemplated however that the distance D could be less than a width of a watercraft for which the trailer 10 is adapted. This would be the case when the walk boards 40 are arranged so as to rest against a lower portion of the hull of the watercraft since the width of the hull generally decreases from its upper portion to the keel of the watercraft.

The walk boards 40, 44 provide surfaces onto which a person can walk when going from the watercraft 47 supported by the trailer 10 to the ground or vice versa. For this reason, the walk boards 40, 44 have generally horizontal upper surfaces in the lateral direction (see FIG. 4 for example). To help prevent the feet of people walking on the walk boards 40, 44 from slipping off the walk boards 40, 44, the walk boards 40, 44 are provided with walls 48 extending upwardly from the inner and outer edges of the walk boards 40, 44. It is contemplated that the walls 48 could be provided only on the outer edges of the walk board 40, 44, only on the inner edges of the walk boards 40, 44, or completely omitted. It is also contemplated that only some of the walk boards 40, 44 could be provided with walls 48 or that only portions of the walk boards 40, 44 could be provided with walls 48. The upper surfaces of the walk boards 40, 44 are preferably textured to also help prevent the feet of people walking on the walk boards 40, 44 from slipping off the walk boards 40, 44. The texturing of the walk boards 40, 44 can be achieved by mixing an abrasive, such as sand, in the paint used to cover the walk boards 40, 44. Other ways of texturing the upper surfaces of the walk boards 40, 44 are also contemplated, such as by creating a raised pattern in the upper surfaces, or by applying a rubber-type carpet on the walk boards 40, 44.

In order to facilitate getting on or off the watercraft 47 when it is supported by the trailer 10, the walk boards 40, 44 are angled in a longitudinal direction relative to the lower frame members 12 such that a distance between the walk boards 40, 44 and the lower frame members 12 is shorter at a front of the walk boards 40, 44 than at a rear of the walk boards 40, 44, as seen in FIG. 6. By angling the walk boards 40, 44 as shown, when the trailer 10 is backed down a ramp (not shown), in order to receive or launch the watercraft 47, the walk boards 40, 44 are generally horizontal thus providing a surface that can be easily walked on. A person getting off the watercraft 47 simply steps on one of the walk boards 40, walks towards a front of the trailer 10 along the walk board 40 and then the walk board 44, and finally steps down from the trailer 10 at a front thereof where there is no water or where the water is shallow. As would be understood, getting on the watercraft 47 from the shore is accomplished by doing the same steps in the reverse direction. Angling the generally U-shaped walk board 44 also reduces the distance from which a person has to step up to or down from the trailer 10 at a front thereof.

It is contemplated that only one of the walk boards 40 could be used with the generally U-shaped walk board 44. It is also contemplated that generally U-shaped walk board 44 could be omitted and that only one or both walk boards 40 could be used, in which case the walk board(s) 40 would preferably be extended closer towards the front of the trailer 10. It is also contemplated that only the generally U-shaped walk board 44 could be used, in which case the generally U-shaped walk board 44 would preferably be extended further back. In any one of these alternative embodiments, the angle between the longitudinally extending lower frame members 12 and a line extending through the back of the walk board(s) 40 and/or 44 being used and a front of the walk board(s) 40 and/or 44 being used is preferably between 5 and 25 degrees. By having walk boards 40 and/or 44 only along one side of the trailer 10, the overall width of the trailer 10 can be reduced.

As best seen in FIG. 6, when viewed from a side elevation view of the trailer 10, the walk boards 40, 44 preferably have a non-linear profile, although linear profiles are contemplated. The non-linear profile is preferably a convex profile. By having a non-linear profile, the range of ramp angles for which at least a portion of the walk boards 40, 44 will provide adequate walking surfaces is increased. For example, if the walk boards 40, 44 have a linear profile and are disposed at an angle of 15 degrees, they will provide adequate walking surfaces for ramp angles between approximately 12 to 18 degrees. However, if the walk boards 40, 44 have different portions for which the angle between each portion and the longitudinally extending lower frame members 12 varies between 10 and 20 degrees, at least a portion of the walk boards 40, 44 will provide adequate walking surfaces for ramp angles between approximately 7 and 23 degrees (as would be understood, the portion providing adequate walking surfaces at a ramp angle of 23 degrees will be different from the portion providing these surfaces at a ramp angle of 7 degrees).

Figure 2:
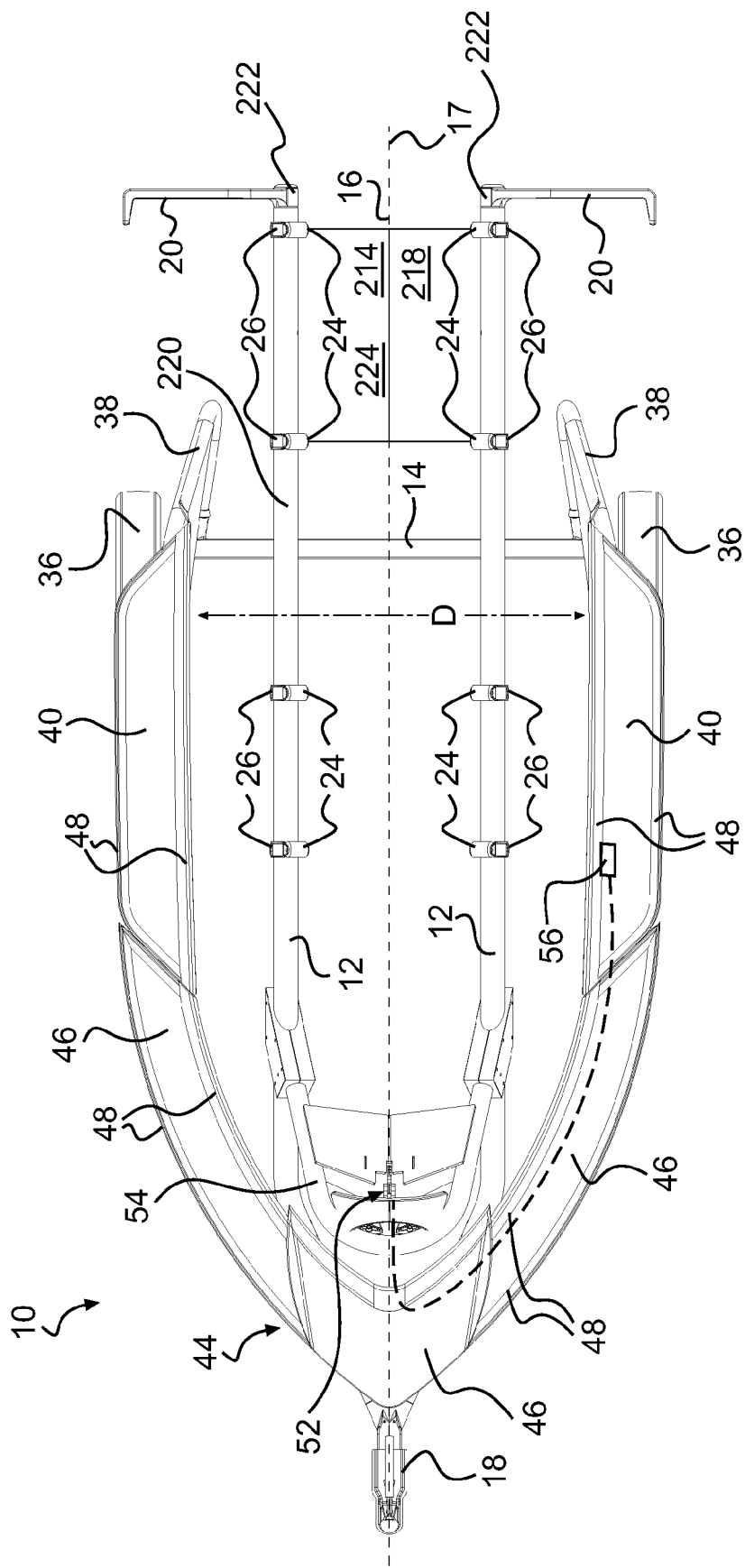
FIG. 2 is top plan view of the trailer of FIG. 1.

As best seen in FIGS. 1 and 2, the trailer 10 is provided with a releasable connector 52 for connecting the watercraft 47 to the trailer 10. The releasable connector 52 is disposed on a longitudinal centerline 17 of the watercraft receiving portion (which corresponds to the longitudinal centerline 16 of the trailer 10) at a front of the watercraft receiving portion. The releasable connector 52 is supported by an inverted U-shaped tubular member 54 having its ends connected to the longitudinally extending lower frame members 12. When the watercraft 47 enters the watercraft receiving portion and contacts the releasable connector 52 as shown in FIG. 6, the releasable connector 52 automatically clamps onto the watercraft 47 thereby connecting the watercraft 47 to the trailer 10. An actuator 56 (FIG. 2), in the form of a lever, a handle, a button, or a switch, is mechanically or electrically connected to the releasable connector 52. Actuating the actuator 56 causes the releasable connector 52 to release the watercraft 47, thereby allowing the watercraft 47 to be launched from the trailer 10. For example, the actuator 56 could be a handle connected via a cable to the releasable connector 52 such that pulling on the handle pulls on the cable which causes the releasable connector 56 to release the watercraft 47. Alternatively, the actuator 56 could be a button connected via an electrical wire to a solenoid actuator operatively connected to the releasable connector 52 such that pushing the button actuates the solenoid actuator which causes the releasable connector 56 to release the watercraft 47. The actuator 56 is preferably disposed on one side of the watercraft receiving portion such that a person on the watercraft 47 can reach the actuator 56 to release the watercraft 10 while being on the watercraft. It is contemplated that the releasable connector could be replaced by a winch which hooks the front of the watercraft 47 or by other suitable connectors.

The inner edges of the walk boards 40 act as guides for aligning the watercraft 47 with the watercraft receiving portion when the watercraft 47 is being driven onto the trailer 10. In order to increase the guiding surface, and to prevent the watercraft 47 from becoming stuck under the walk boards 40, walls 58 extend downwardly from the inner edges of the walk boards 40. If the watercraft 47 is driven out of alignment into the watercraft receiving portion, the walk boards 40 will cause it to become aligned between the longitudinally extending lower frame members 12 as the watercraft continues to move forward, until the watercraft 47 becomes supported by the rollers 26 (and therefore by the lower frame as seen in FIG. 4), and the watercraft 47 is finally connected to the trailer by the releasable connector 52. It is contemplated that the walls 58 can be omitted (FIG. 7).

It is contemplated that the angled walk boards 40, 44 used on the trailer 10 could be used on a trailer having two watercraft receiving portions disposed side by side in order to accommodate two watercraft, similar to trailers 100 and 101 described below. A trailer such as the trailer 100 would have one walk board 40 disposed on each side of the trailer and another walk board 40 disposed on the center which would be in common for both watercraft receiving portions. Two generally U-shaped walk boards 44 would be provided side-by-side or, alternatively, a single W-shaped walk board. It is contemplated that in an alternative embodiment, no central walk board 40 would be provided. It is also contemplated that in another alternative embodiment, only the central walk board 40 would be provided. By having fewer than three walk boards 40, the overall width of the trailer 10 can be reduced.

It is understood that when the walk boards are omitted, the watercraft receiving space is defined by the space between the left and right upper frame members 38, the front of the trailer and the rear end 222 of the trailer. In the case when both the walk boards and the upper frame members are omitted, the watercraft receiving space is defined by the space above the lower frame, upward from the watercraft supporting members 24, and between the front of the trailer and the rear end 222 of the trailer, where a watercraft would typically be received as it is understood by a person skilled in the art of watercraft trailers.

An intake protector 214 is connected to the right and left frame members 12. The intake protector 214 is a panel located in the rear portion of the trailer 10, such that the intake protector 214 is aligned with the intake 210 of the jet propulsion system of the watercraft 47 when the watercraft is disposed in the watercraft receiving space. The intake protector 214 is adapted to prevent rocks, sand and other debris located on a bottom of a body of water from entering the intake 210 when the jet propulsion system is functioning and the watercraft 47 is located in the watercraft receiving portion of the trailer 10 with the trailer 10 at least partly in the water. The intake protector 214 allows the water to flow into a space between the hull 200 of the watercraft 47 and a top side 218 intake protector top 214. When the jet propulsion system is functioning and the water is being sucked into the intake 210, the intake protector 214 only allows the water located around and above the top side 218 to flow into the space between hull 200 and the top side 218, and prevents the rocks, sand and other debris located on a bottom of a body of water below a bottom side 216 of the intake protector 214 from being sucked into the intake 210. The intake protector 214 is located in the rear portion 220 of the trailer 10 between the rotation axis 34 and the rear end 222 of the trailer 10. However, it should be understood that the intake protector 214 may extend into any other part of the lower frame of the trailer 10.

Figure 11:
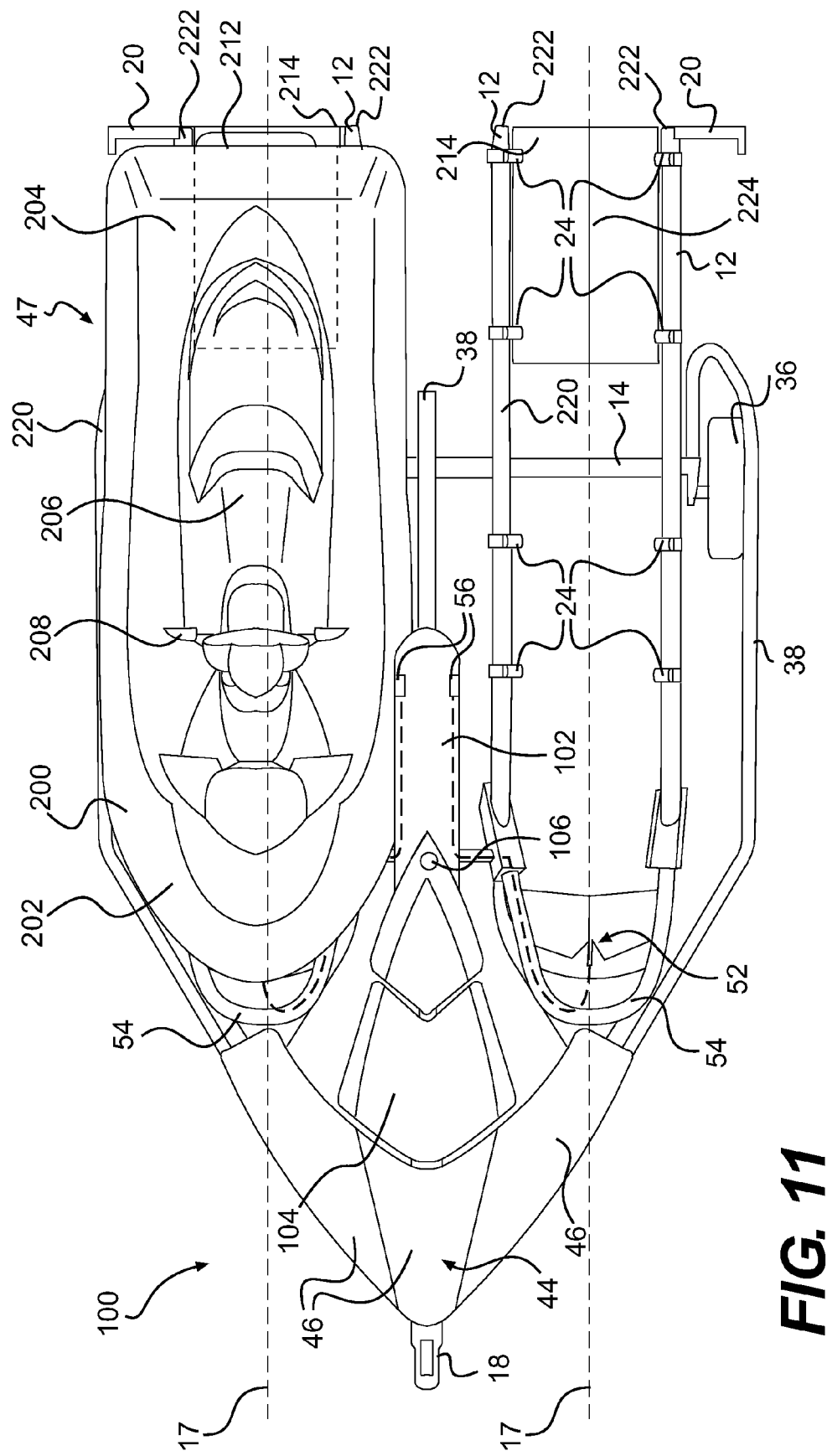
FIG. 11 is a top plan view of a fourth embodiment of a watercraft trailer with two intake protectors attached thereto and with a personal watercraft supported thereon.
Figure 14:
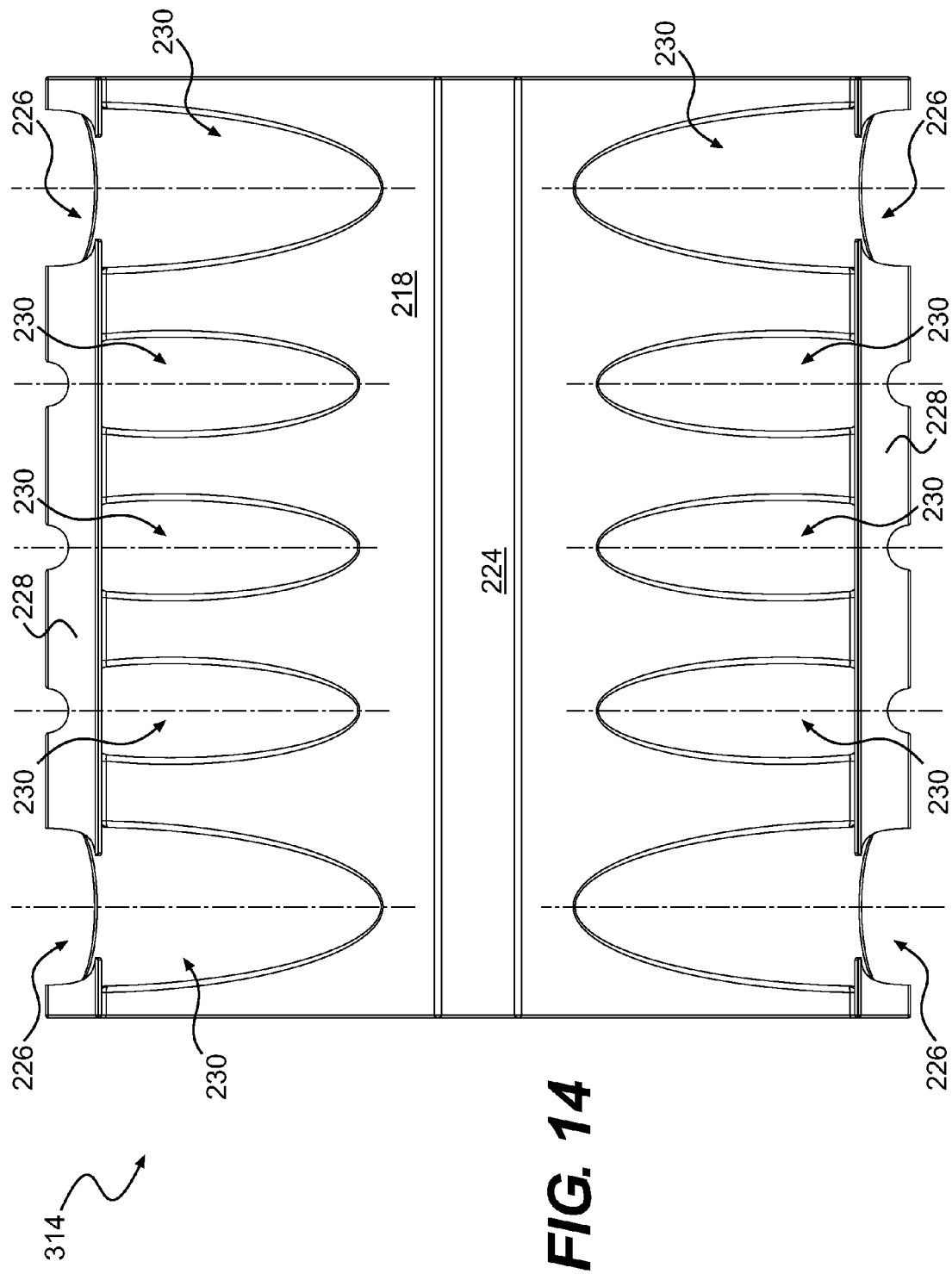
FIG. 14 is a top plan view of the intake protector of FIG. 12.

The watercraft receiving portion has the longitudinal centerline 17, which coincides with the centerline 16 of a trailer when the trailer is adapted to receive only one watercraft, such as the trailer 10. In the case when a trailer is adapted to receive two watercraft as in FIG. 11, each watercraft receiving portion has a longitudinal centerline 17 (FIG. 11). In either case, the longitudinal centerline 17 passes through a center portion 224 of the intake protector 210.

The intake protector 214 is fastened, welded or otherwise coupled to the lower frame. It is understood that the intake protector 214 may be attached to any of the laterally extending lower frame member 14, the longitudinally extending lower frame members 12, or the watercraft support members 24. Furthermore, to accommodate a V-shaped hull 200 of the watercraft 47, the intake protector 214 has a V-shaped cross-section.

When the watercraft 47 is received in the watercraft receiving portion, the intake protector 214 is spaced from the hull 200 of the watercraft 47 to allow water to flow between the hull 200 and the intake protector 214 and to ensure that the intake protector 214 is not damaged during the receiving or launching of the watercraft 47.

Turning now to FIGS. 7 to 9, a second embodiment of a watercraft trailer 11 will be described. For simplicity, the features and components of the trailer 11 which are similar to those of the trailer 10 have been labelled with the same reference numeral and will not be described again below. It should be noted that in the trailer 11 the brackets 20 are not connected to the ends of the right and left longitudinally extending lower frame members 12 as in the trailer 10, rather the brackets are connected to lateral extensions 13. The extensions 13 extend outwardly from the right and left lower frame members 12 and are generally perpendicular to the right and left lower frame members 12. Rear ends of the upper frame members 38 are connected to the lower frame essentially at the same location on the lower frame as the lateral extensions 13. Contrary to the trailer 10, the upper frame members 38 do not extend to the front of the trailer 11, rather the front ends of the upper frame members 38 connect, proximate the rear portion of the trailer, to the laterally extending member 14. Notably, the trailer 11 does not have separate walk boards 40 and 44 as the trailer 10, rather the walk boards 40 and 44 of trailer 11 form a single U-shaped walk board that will be denoted in this application as the walk board 44. The U-shaped walk board 44 is connected to the front of the trailer 11 similarly to the described above trailer 10, and the walk board 44 is supported by the upper frame members 38 solely at rear ends of the walk board 44.

The trailer 11 has an intake protector 314 connected to the longitudinally extending lower frame members 12 similarly to intake protector 214 of the described above trailer 10. For simplicity, the features and components of the intake protector 314 of the trailer 11 which are similar to those of the intake protector 214 of the trailer 10 have been labelled with the same reference numeral and will not be described again below.

The intake protector 314 has water flow apertures 226 to allow water to flow from sides 228 of the intake protector 314 towards the center portion 224 of the top side 218. It is contemplated that water flow apertures 226 may be located anywhere in the intake protector 314, as long as rocks and debris are hampered from entering, along with the water, the space between the top side 218 of the intake protector 314 and the hull 200 of the watercraft 47. It is also understood that there may be only one water flow aperture.

Figure 15:
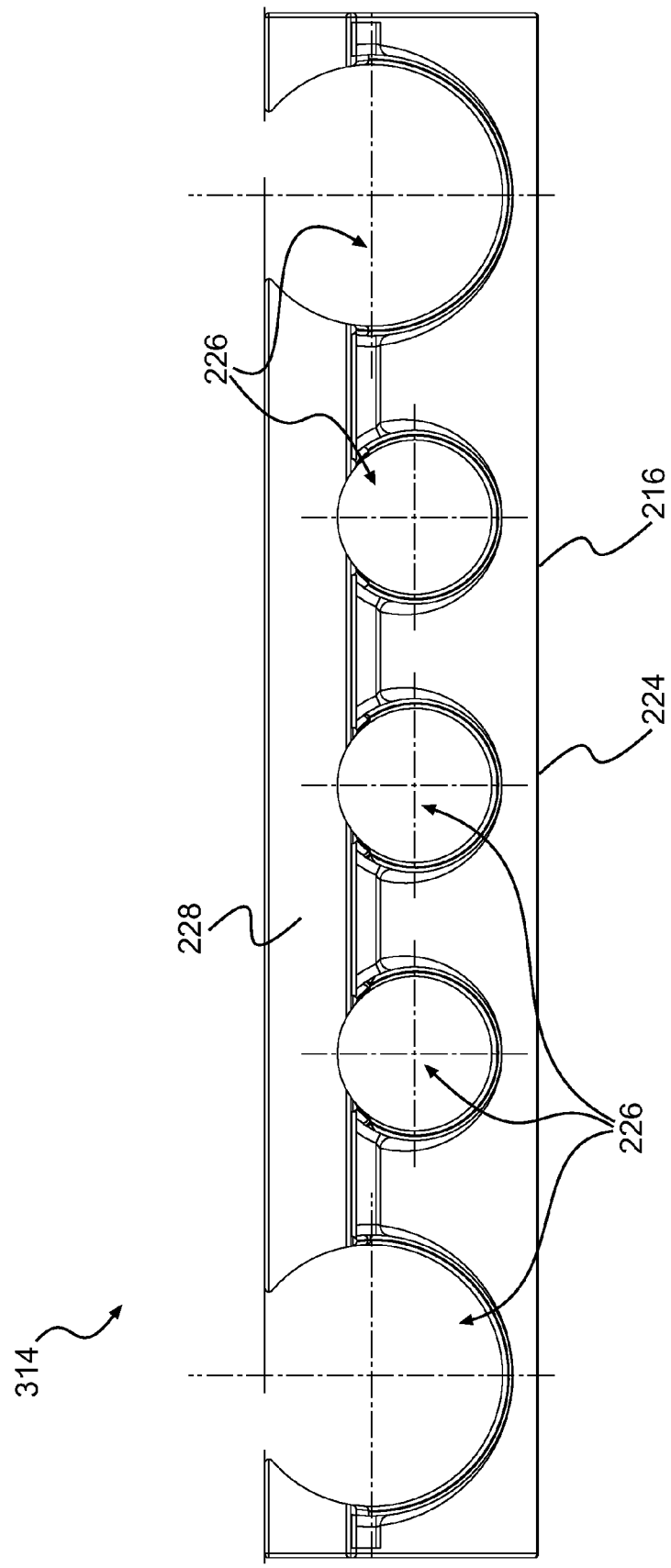
FIG. 15 is a left side elevation view of the intake protector of FIG. 12.

FIGS. 12 to 16 illustrate the intake protector 314 of the trailer 11. The intake protector 314 is a panel with bulging indents 230 therein for housing water flow apertures 226. As best seen in FIG. 15, the intake protector 314 has water flow apertures 226 of different sizes. It is contemplated that the intake protector 314 may have the water flow apertures, but not the bulging indents.

Figure 16:
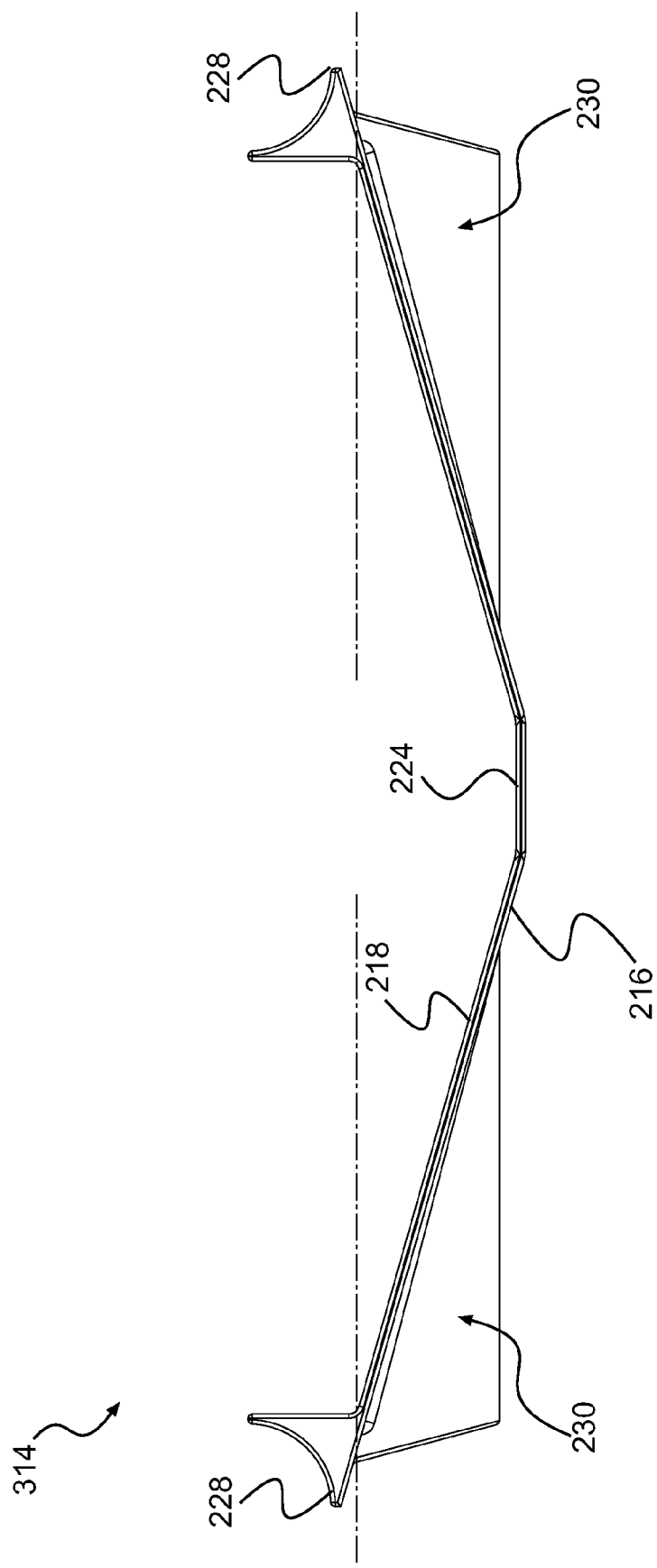
FIG. 16 is a front elevation view of the intake protector of FIG. 12.

As best seen in FIG. 16, the intake protector 314 is a panel having a central bend giving the panel a V-shaped cross-section. The central bend is parallel to the centerline 17 (FIG. 9). The V-shape of the intake protector 314 accommodates the V-shaped hull of a watercraft. It is contemplated, that the central bend does not have to be central and may be located anywhere in the panel. It is contemplated, that the intake protector 314 may be a panel having a U-shape, a W-shape, or a bowl-like shape cross-section. Alternatively, the intake protector 314 may simply be a substantially flat panel.

Figure 10:
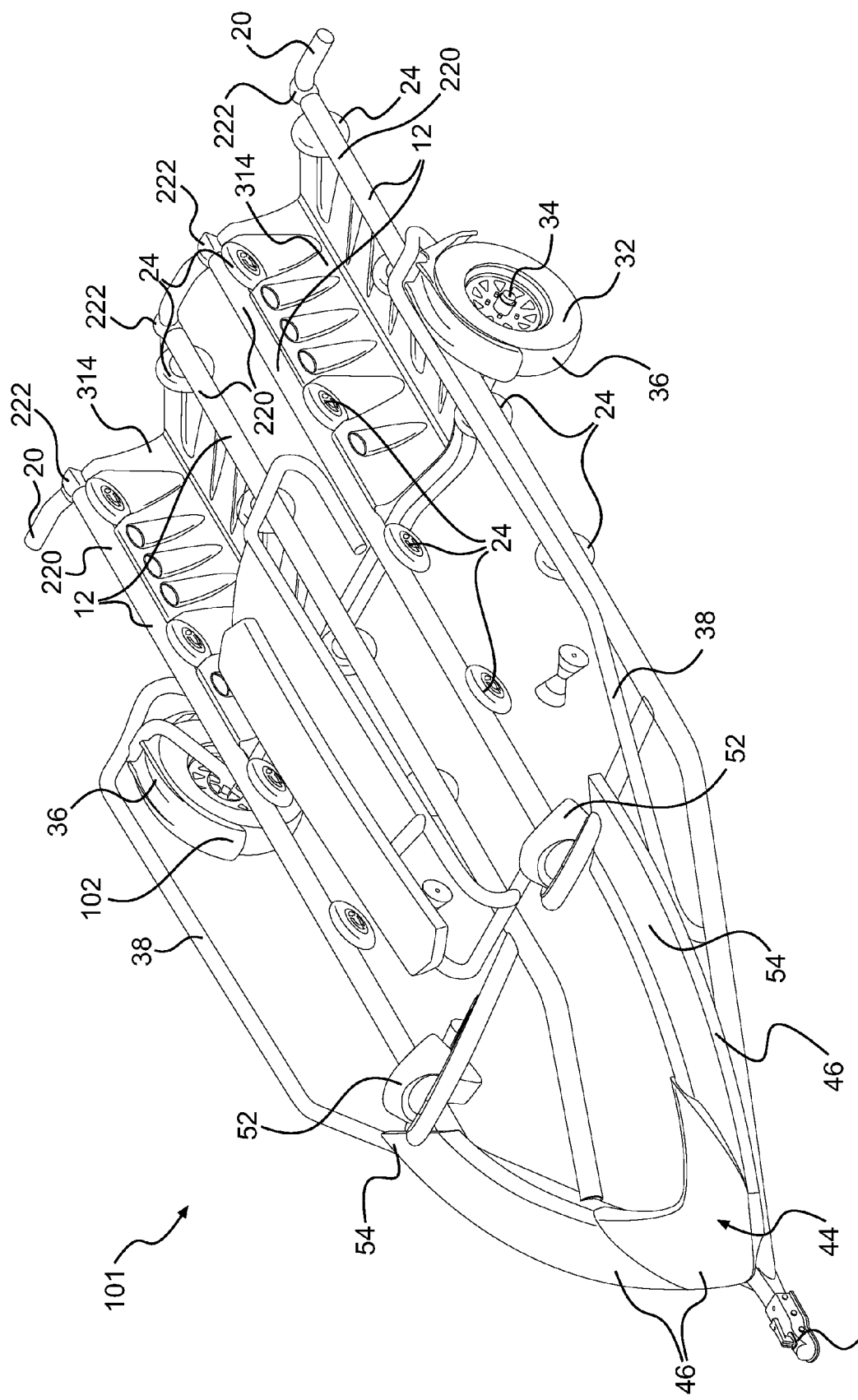
FIG. 10 is a top perspective view, taken from a front, left side, of a third embodiment of a watercraft trailer with two intake protectors attached thereto.

Turning now to FIGS. 10 and 11, watercraft trailers 100 and 101 will be described. For simplicity, the features and components of the trailers 100 and 101 which are similar to those of the trailer 10 and 11 have been labelled with the same reference numeral and will not be described again below.

As can be seen, the trailers 100 and 101 have two watercraft receiving portions each and are both adapted to transport two watercraft such as watercraft 47. As such, the trailers 100 and 101 have right and left upper frame members 38, and central upper frame members 38 disposed on the longitudinal centerlines 16 of the trailers. The right and central upper frame members 38 define a right watercraft receiving portion therebetween, and the left and central upper frame members 38 define a left watercraft receiving portion therebetween. Each watercraft receiving portion has the longitudinal centerline 17. The trailers 100 and 101 have four longitudinally extending lower frame members 12 arranged as shown and a single laterally extending lower frame member 14 to connect the two wheels 32. Only the two laterally outermost longitudinally extending lower frame members 12 are provided with brackets 20. Each watercraft receiving portion has a releasable connector 52 supported on the longitudinal centerline 17 thereof by an inverted U-shaped tubular member 54. Each releasable connector 52 has an actuator 56 associated therewith. The actuators 56 are disposed on the walk boards 102 (described below). A generally U-shaped walk board 44 is disposed at the front of each trailer 100 and 101 and is supported in part by the left and right upper frame members 38.

In trailer 100, the walk boards 40 have been replaced by a walk board 102 and a step 104 described in greater detail below. Since the walk boards 40 are no longer present, it is the upper frame members 38 that provide the guiding feature that was provided by the walk boards 40 in the trailer 10.

In trailer 100, the walk board 102 and step 104 are supported by the central upper frame member 38, and as such can be used by a person getting on or off a watercraft disposed in either one of the watercraft receiving portions. The step 104 is disposed at least in part forwardly of the walk board 102 and at a vertically lower position than the walk board 102. Similarly, the generally U-shaped walk board 44 is disposed at least in part forwardly of the step 104 and at a vertically lower position than the step 104. As such, the walk board 102, the step 104, and the generally U-shaped walk board 44 act as stairs which permit a person to easily get from a watercraft supported in the trailer 100 to the ground and vice versa. It is contemplated that the generally U-shaped walk board 44 could be omitted, in which case the step 104 would preferably extend closer to the front of the trailer 100. It is also contemplated that the right and left upper frame members 38 could also each be provided with a walk board 102 and a step 104.

Like the walk boards 40, the walk board 102 and the step 104 are at least 5 cm wide. In the embodiment shown, the step 104 is wider than the walk board 102, and the generally U-shaped walk board 44 is wider than the step 104. This allows a person stepping down from the trailer 100 to move laterally away from the longitudinal centerline 16, thus avoiding stepping on the hitch coupler 18.

Similarly to the walk boards 40, the upper surfaces of the walk board 102 and step 104 are preferably textured to help prevent the feet of people walking on the walk board 102 and step 104 from slipping off the walk board 102 and step 104. A pole 106 extending vertically upwardly form the walk board 102 can be grabbed by a person walking on the walk board 102 and the step 104, which can also help prevent a person from slipping off the walk board 102 and step 104.

It is contemplated that one or both walk boards 40 of the trailer 10 described above could be replaced by the walk board 102 and step 104.

The trailer 100 has two intake protectors 214 (FIG. 11) connected to the longitudinally extending lower frame members 12. Intake protectors 214 are disposed in a rear portion 220 of the trailer 100, between a rotation axis 34 and a rear end 222, similarly to the intake protector 214 of the trailer 10. The intake protectors 214 of the trailer 100 are aligned with corresponding intakes of corresponding watercraft, when these watercraft are positioned in the watercraft receiving portions of the trailer 100. The intake protector 214 was described in detail above and this description applies to the trailer 100.

The trailer 101 does not have the step 104 as the trailer 100, but is otherwise similar to the trailer 100 and as such will no be described in detail.

The trailer 101 has two intake protectors 314 (FIG. 10) connected to the longitudinally extending lower frame members 12. Intake protectors 314 are disposed in a rear portion 220 of the trailer 101, between a rotation axis 34 and a rear end 222, similarly to the intake protector 314 of the trailer 11. The intake protectors 314 are aligned with the intakes of corresponding watercraft, when these watercraft are positioned in the watercraft receiving portions of the trailer 101. The intake protector 314 was described in detail above and this description applies to the trailer 101.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A watercraft trailer comprising:
   at least one watercraft receiving portion having a longitudinal centerline;
   a lower frame adapted to support a watercraft in the at least one watercraft receiving portion, the lower frame having at least one longitudinally extending member, a front portion, and a rear portion located rearwardly of the front portion, a rearmost part of the rear portion being a rear end;

a hitch coupler connected to the front portion of the lower frame;

a first wheel and a second wheel operatively connected to the lower frame, the first wheel having a rotation axis; and at least one longitudinally extending intake protector connected to the rear portion of the lower frame;

wherein a vertical plane containing the longitudinal centerline passes through the at least one intake protector, and at least a portion of the at least one intake protector is disposed between the rotation axis and the rear end of the lower frame, such that when the watercraft is received in the at least one watercraft receiving portion the at least one intake protector is disposed below at least a portion of the watercraft.

2. The watercraft trailer of claim 1, wherein the at least one intake protector has at least one water flow aperture.

3. The watercraft trailer of claim 1, wherein when the watercraft is received in the at least one watercraft receiving portion the at least one intake protector is spaced from the portion of the watercraft.

4. The watercraft trailer of claim 1, wherein the lower frame has a watercraft support member.

5. The watercraft trailer of claim 4, wherein the at least one intake protector is connected to the watercraft support member.

6. The watercraft trailer of claim 4, wherein the watercraft support member is connected to the at least one longitudinally extending member.

7. The watercraft trailer of claim 1, wherein the at least one intake protector is connected to the at least one longitudinally extending member.

8. The watercraft trailer of claim 1, wherein the at least one watercraft receiving portion is two watercraft receiving portions disposed side by side;

wherein the at least one intake protector is two intake protectors, one of the two intake protectors being disposed in each of the two watercraft receiving portions between the rotation axis and the rear end of the lower frame, such that when two watercraft are received in the two watercraft receiving portions, the two intake protectors are disposed below at least a portion of each of the watercraft.

9. The watercraft trailer of claim 1, wherein the lower frame has a laterally extending member connected to the at least one longitudinally extending member, the laterally extending member having a first end, a second end opposite the first end;

wherein the first wheel is coupled to a first end and the second wheel is coupled to the second end; and wherein the at least one intake protector is connected to the laterally extending member.

10. The watercraft trailer of claim 1, wherein the at least one intake protector has a generally V-shaped cross-section.

11. A trailer adapted for towing a watercraft, the watercraft having a hull, and a jet propulsion system, the jet propulsion system having an intake located in a bottom of the hull, the trailer comprising:

at least one watercraft receiving portion;

a lower frame adapted to support a watercraft in the at least one watercraft receiving portion, the lower frame having at least one longitudinally extending lower frame member, a front portion, and a rear portion located rearwardly of the front portion;

a hitch coupler connected to a front of the lower frame;

a first wheel and a second wheel operatively connected to the lower frame, the first wheel having a rotation axis; and at least one intake protector connected to the lower frame, such that when the watercraft is received in the at least one watercraft receiving portion, the at least one intake protector is aligned with the intake of the jet propulsion system.

12. The watercraft trailer of claim 10, wherein the at least one intake protector has at least one water flow aperture.

13. The watercraft trailer of claim 10, wherein when the watercraft is received in the at least one watercraft receiving portion, the at least one intake protector is spaced from the intake of the jet propulsion system.

14. The watercraft trailer of claim 10, wherein the at least one intake protector is connected to the rear portion of the lower frame.

15. The watercraft trailer of claim 10, wherein the lower frame has a watercraft support member.

16. The watercraft trailer of claim 14, wherein the at least one intake protector is connected to the watercraft support member.

17. The watercraft trailer of claim 10, wherein the lower frame has a laterally extending member connected to the at least one longitudinally extending member, the laterally extending member having a first end, a second end opposite the first end;

wherein the first wheel is coupled to a first end and the second wheel is coupled to the second end; and wherein the at least one intake protector is connected to the laterally extending member.

18. The watercraft trailer of claim 10, wherein the at least one intake protector is connected to the at least one longitudinally extending member.

19. The watercraft trailer of claim 10, wherein the at least one watercraft receiving portion is two watercraft receiving portions disposed side by side; and wherein the at least one intake protector is two intake protectors, one of the two intake protectors being disposed in each one of the two watercraft receiving portions such that when two watercraft are received in the two watercraft receiving portions, each intake protector is aligned with an intake of the jet propulsion systems of a corresponding watercraft.

20. The watercraft trailer of claim 10, wherein the at least one intake protector has a generally V-shaped cross-section.

* * * * *